US010496436B2

(12) United States Patent
Song et al.

(10) Patent No.: US 10,496,436 B2
(45) Date of Patent: Dec. 3, 2019

(54) METHOD AND APPARATUS FOR AUTOMATICALLY SCHEDULING JOBS IN COMPUTER NUMERICAL CONTROL MACHINES USING MACHINE LEARNING APPROACHES

(71) Applicant: Pusan National University Industry-University Cooperation Foundation, Busan (KR)

(72) Inventors: Giltae Song, Busan (KR); Hongtaek Oh, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 16/218,195

(22) Filed: Dec. 12, 2018

(65) Prior Publication Data
US 2019/0303196 A1    Oct. 3, 2019

(30) Foreign Application Priority Data
Jan. 30, 2018   (KR) .................. 10-2018-0011200

(51) Int. Cl.
*G06F 9/46*    (2006.01)
*G06F 9/48*    (2006.01)
(Continued)

(52) U.S. Cl.
CPC .......... *G06F 9/4843* (2013.01); *G05B 19/18* (2013.01); *G06N 20/00* (2019.01)

(58) Field of Classification Search
None
See application file for complete search history.

(56) References Cited

U.S. PATENT DOCUMENTS

2011/0224816 A1*  9/2011  Pereira ............. G05B 19/41865
                                                              700/100
2014/0189703 A1*  7/2014  Gilder ...................... G06F 9/50
                                                              718/104
(Continued)

FOREIGN PATENT DOCUMENTS

JP            05-225203        9/1993

OTHER PUBLICATIONS

Hou et al. "A Genetic Algorithm for Multiprocessor Scheduling", 1994 (Year: 1994).*

(Continued)

*Primary Examiner* — Bradley A Teets
(74) *Attorney, Agent, or Firm* — EIP US LLP

(57) ABSTRACT

The method includes collecting a schedule job list from a database, generating a plurality of schedules for a schedule job to be processed with respect to the schedule job list, calculating an evaluation index for the plurality of generated schedules, determining whether the calculated evaluation index for the plurality of schedules has reached a target evaluation index, selecting a schedule corresponding to two evaluation indices when the calculated evaluation index does not reach the target evaluation index and generating two new schedules using a genetic algorithm, and setting a selection probability so that a schedule having the highest evaluation index is selected and returning the selection probability to a user when the calculated evaluation index reaches the target evaluation index.

1 Claim, 4 Drawing Sheets

(51) Int. Cl.
*G05B 19/18* (2006.01)
*G06N 20/00* (2019.01)

(56) References Cited

U.S. PATENT DOCUMENTS

2018/0276045 A1* 9/2018 Netto .................... G06F 9/4881
2018/0307945 A1* 10/2018 Haigh .................... G06N 20/00

OTHER PUBLICATIONS

Balic et al. "Intelligent programming of CNC turning operations using genetic algorithm", 2005 (Year: 2005).*

* cited by examiner

METHOD AND APPARATUS FOR AUTOMATICALLY SCHEDULING JOBS IN COMPUTER NUMERICAL CONTROL MACHINES USING MACHINE LEARNING APPROACHES

CROSS-REFERENCE TO RELATED APPLICATIONS

The present application claims the benefit of Korean Patent Application No. 10-2018-0011200 filed in the Korean Intellectual Property Office on Jan. 30, 2018, the entire contents of which are incorporated herein by reference.

BACKGROUND OF THE INVENTION

Field of the Invention

The present invention relates to a method and apparatus for automatically scheduling jobs in computer numerical control machines using machine learning.

Description of the Related Technology

Conventional scheduling programming inventions are limited to an airplane schedule or the time table schedule of a part time. In such a case, most of types of scheduling are performed in a rule-based form according to each condition and an evaluation criterion is not clear, thereby making ambiguous performance evaluation for produced scheduling results.

In a factory in which products are fabricated using a computer numerical control machine, several thousands of types of products are distributed to machines suitable for conditions depending on the size or shape of each product and are fabricated. In this case, such conditions act as a kind of constraints in scheduling. The reason for this is that a product cannot be distributed to a machine that does not satisfy such a condition although there is machine to which a job has not been now assigned. Accordingly, there is a need for a method of proposing an optimized schedule necessary for a production site while satisfying such schedule constraints.

SUMMARY

An object of the present invention is to provide a method and apparatus for proposing an optimized schedule necessary for a production site while satisfying schedule constraints.

In an aspect, an embodiment of the present invention proposes a method of automatically scheduling jobs in computer numerical control machines using machine learning, including the steps of collecting a schedule job list from a database, generating a plurality of schedules for a schedule job to be processed with respect to the schedule job list, calculating an evaluation index for the plurality of generated schedules, determining whether the calculated evaluation index for the plurality of schedules has reached a target evaluation index, selecting a schedule corresponding to two evaluation indices when the calculated evaluation index does not reach the target evaluation index and generating two new schedules using a genetic algorithm, and setting a selection probability so that a schedule having the highest evaluation index is selected and returning the selection probability to a user when the calculated evaluation index reaches the target evaluation index.

The step of selecting a schedule corresponding to two evaluation indices and generating two new schedules using a genetic algorithm is repeatedly performed until new schedules corresponding to the number of plurality of schedules are generated.

The step of selecting a schedule corresponding to two evaluation indices and generating two new schedules using a genetic algorithm includes grouping two schedules into a pair with respect to the plurality of schedules, generating two new schedules for each schedule pair through crossover operation and mutation operation, and updating the two schedules with the two new schedules.

The schedule returned to the user is incorporated into job assignment information for each machine, and the job assignment information for each machine is displayed.

Jobs are redistributed according to the schedule incorporated into the job assignment information for each machine, and the redistributed results are visualized and displayed on a screen.

In another aspect, an embodiment of the present invention proposes an apparatus for automatically scheduling jobs in computer numerical control machines using machine learning, including a pre-processing unit configured to collect a schedule job list from a database, a genetic algorithm-based schedule generation unit configured to generate a plurality of schedules for a schedule job to be processed with respect to the schedule job list, select a schedule corresponding to two evaluation indices when an evaluation index does not reach a target evaluation index based on a result of a schedule analysis unit, and generate two new schedules using a genetic algorithm, a schedule evaluation unit configured to calculate an evaluation index for the plurality of generated schedules, a schedule analysis unit configured to determine whether the calculated evaluation index for the plurality of schedules reaches a target evaluation index, and a display unit configured to incorporate the schedule returned to the user into job assignment information for each machine and to display the job assignment information for each machine.

The genetic algorithm-based schedule generation unit repeatedly performs selecting a schedule corresponding to two evaluation indices and generating two new schedules using a genetic algorithm until new schedules corresponding to the number of plurality of schedules are generated.

The genetic algorithm-based schedule generation unit groups two schedules into a pair with respect to the plurality of schedules, generates two new schedules for each schedule pair through crossover operation and mutation operation, and updates the two schedules with the two new schedules.

The schedule analysis unit sets a selection probability so that a schedule having the highest evaluation index is selected and returns the selection probability to a user when the calculated evaluation index reaches the target evaluation index.

The schedule analysis unit redistributes jobs according to the schedule incorporated into the job assignment information for each machine, visualizes the redistributed results, and displays the visualized results on a screen.

DETAILED DESCRIPTION OF CERTAIN INVENTIVE EMBODIMENTS

In a factory in which products are fabricated using a computer numerical control machine, several thousands of types of products are distributed to machines suitable for conditions depending on the size or shape of each product and are fabricated. In this case, such conditions act as a kind of constraints in scheduling. The reason for this is that a product cannot be distributed to a machine that does not satisfy such a condition although there is machine to which a job has not been now assigned. The present invention proposes an optimized schedule necessary for a production site while satisfying such schedule constraints. Hereinafter, embodiments of the present invention are described in detail with reference to the accompanying drawings.

Figure 1:
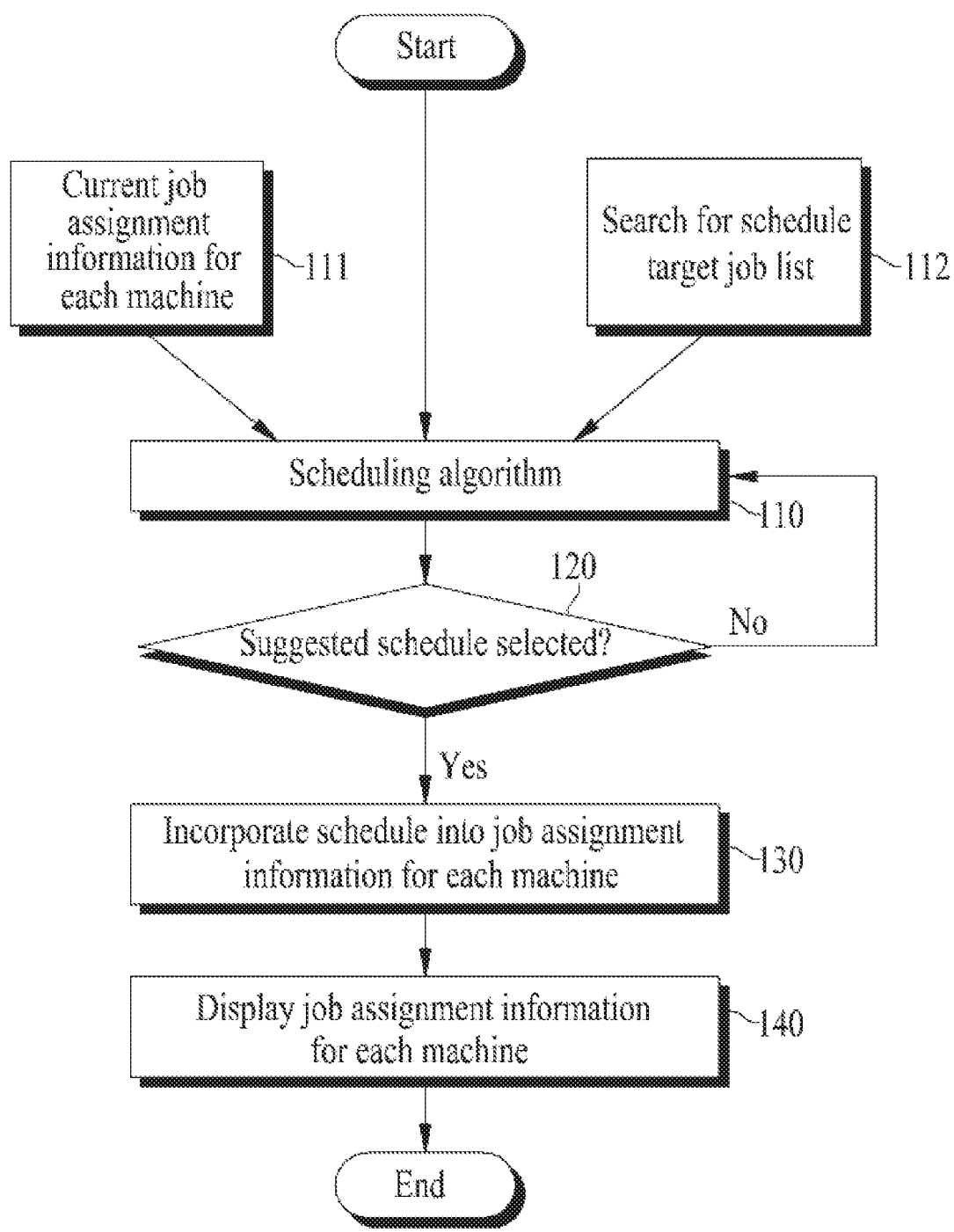
FIG. 1 is a schematic diagram for illustrating a process of automatically scheduling jobs in computer numerical control machines based on machine learning according to an embodiment of the present invention.

FIG. 1 is a schematic diagram for illustrating a process of automatically scheduling jobs in computer numerical control machines based on machine learning according to an embodiment of the present invention.

In a proposed process of automatically scheduling jobs in computer numerical control machines based on machine learning, first, current job assignment information 111 on each machine is collected from a database, and a schedule target job list is searched for (112).

A scheduling algorithm 110 proposed in an embodiment of the present invention is applied using the collected information. One of the most important characteristics of the present invention is to not produce a single schedule result according to a deterministic algorithm, but to use a genetic algorithm method, that is, a method of generating various schedules, evaluating the schedules by applying three scheduling performance evaluation indices that are autonomously invented, gradually developing the schedules into new schedules, and training the best schedule results. The three indices according to an embodiment of the present invention include the number of jobs whose deadline has not been met, the sum of times later than deadlines with respect to all jobs, and the end time of a job that is finally terminated.

The scheduling algorithm 110 generates a plurality of schedules for a schedule job to be processed with respect to a schedule job list, and calculates evaluation index for the plurality of generated schedules. The scheduling algorithm determines whether the calculated evaluation index for the plurality of schedules has reached a target evaluation index, selects a schedule corresponding to two evaluation indices when the calculated evaluation index does not reach the target evaluation index, and generates two new schedules using the genetic algorithm. The scheduling algorithm repeatedly performs such steps until new schedules corresponding to the number of plurality of schedules are generated. In contrast, when the calculated evaluation index reaches the target evaluation index, the scheduling algorithm sets a selection probability so that a schedule having the highest evaluation index is selected, and returns the set selection probability to a user.

After a suggested schedule is selected using the scheduling algorithm 110 (120), the suggested schedule is incorporated into job assignment information for each machine (130). If the suggested schedule has not been selected, a process is repeated from the step of applying the scheduling algorithm 110.

After the suggested schedule is incorporated into the job assignment information for each machine, the job assignment information for each machine is displayed on a display unit (140). The proposed scheduling algorithm 110 is described more specifically with reference to FIG. 2.

Figure 2:
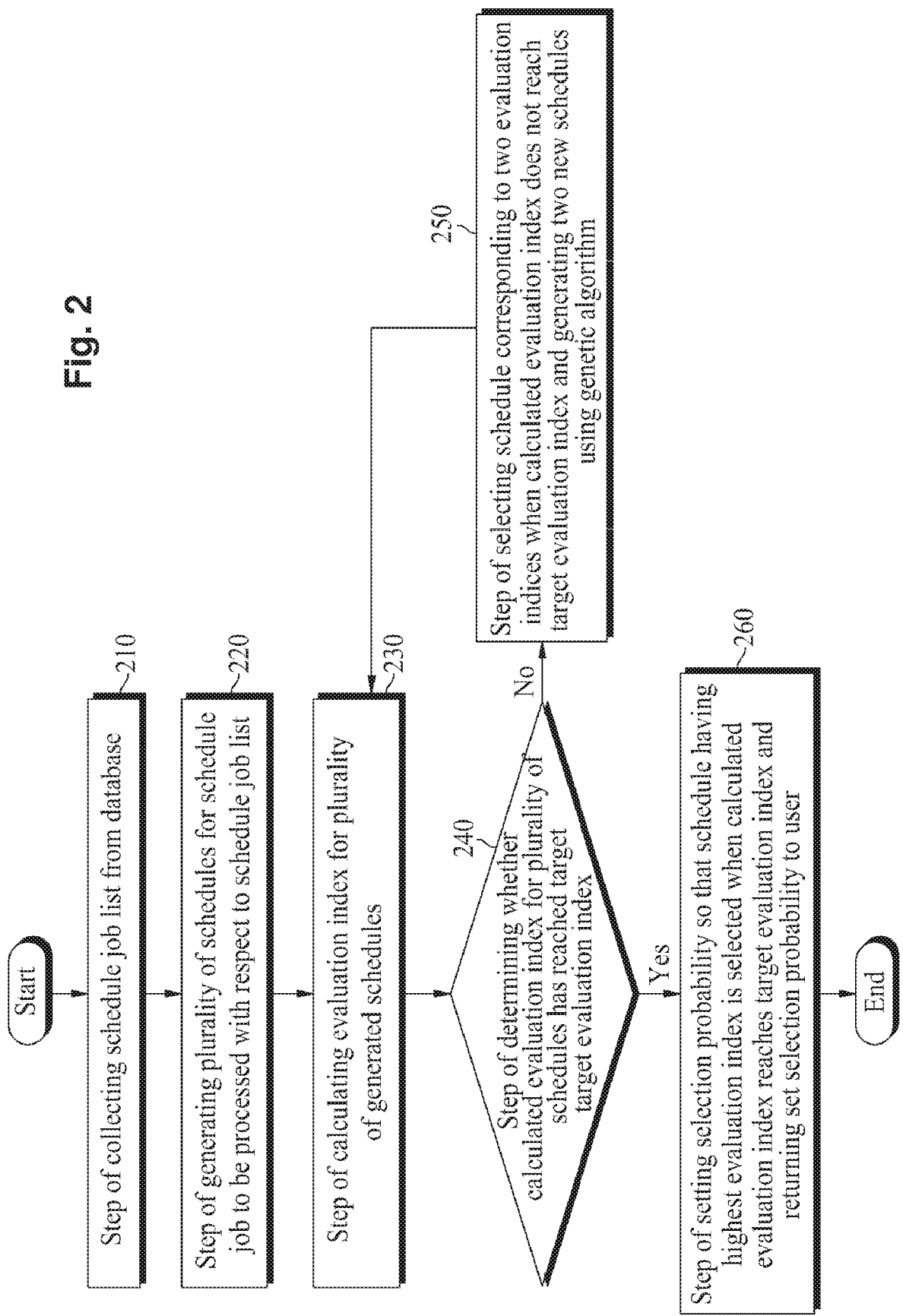
FIG. 2 is a flowchart for illustrating a scheduling method according to an embodiment of the present invention.

FIG. 2 is a flowchart for illustrating a scheduling method according to an embodiment of the present invention.

A scheduling method according to an embodiment of the present invention includes step 210 of collecting a schedule job list from a database, step 220 of generating a plurality of schedules for a schedule job to be processed with respect to the schedule job list, step 230 of calculating an evaluation index for the plurality of generated schedules, step 240 of determining whether the calculated evaluation index for the plurality of schedules has reached a target evaluation index, step 250 of selecting a schedule corresponding to two evaluation indices when the calculated evaluation index does not reach the target evaluation index and generating two new schedules using the genetic algorithm, and step 260 of setting a selection probability so that a schedule having the highest evaluation index is selected when the calculated evaluation index reaches the target evaluation index and returning the set selection probability to a user.

At step 210, a schedule job list is collected from a database. Target job lists to be first scheduled are fetched from the database.

At step 220, a plurality of schedules is generated with respect to a schedule job to be processed with respect to the schedule job list. N schedules are randomly generated using the target job lists to be scheduled, fetched from the database.

At step 230, an evaluation index for the plurality of generated schedules is calculated. Thereafter, a selection probability is selected so that schedules having a better evaluation index have a high selection probability.

At step 240, whether the calculated evaluation index for the plurality of schedules has reached a target evaluation index is determined.

When the calculated evaluation index does not reach the target evaluation index, at step 250, a schedule corresponding to two evaluation indices is selected and two new schedules are generated using the genetic algorithm.

The step of selecting a schedule corresponding to two evaluation indices and generating two new schedules using the genetic algorithm is repeatedly performed until new schedules corresponding to the number of plurality of schedules are generated.

In other words, the N schedules are grouped in pairs. Each schedule pair is updated with new two schedules through crossover operation and mutation operation. Crossover and mutation are repeatedly performed on the new N schedules generated in this way. Whenever the new N schedules are generated, various schedules having gradually better evaluation indices are generated through the repetition of selection and evaluation processes. Thereafter, the process returns to step 230 of calculating an evaluation index for the plurality of generated schedules.

When the calculated evaluation index reaches the target evaluation index, at step 260, a selection probability is set so that a schedule having the highest evaluation index is selected and returned to a user. Thereafter, the schedule returned to the user is incorporated into job assignment information for each machine, and the job assignment information for each machine is displayed. Furthermore, jobs are redistributed according to the schedule incorporated into the job assignment information for each machine. The redistributed results are visualized and displayed on a screen.

Three evaluation metrics are regarded to measure the optimal level of a given schedule. They are the number of jobs that violates their deadlines, a total of delay hours for jobs over due, and the end time of the last job processed. In this regard, the schedule that minimizes these metrics is to be determined.

The rank of a schedule in terms of its optimal level can be different according to what individual evaluation metric is used to measure it. To resolve this issue, ranks of all schedules in a set of solutions are assigned using each individual evaluation metric. The ranks are finalized using an approach based on Parent ranking. After generating new schedules and updating them repeatedly using the genetic algorithm, a set of schedules in the highest ranks based on Parent ranking is obtained.

To update a pair of schedules using the crossover operation in the genetic algorithm, the present invention may set a portion of a solution representation as a crossover interval and apply partially matched crossover on it. For the mutation operation, the present invention may assign a mutation interval and reverse the order of elements using simple inversion mutation.

For updating schedules in a set of solutions in each generation, NSGA-II (Non-dominated sorting genetic algorithm-II) is applied to maintain the schedules in top ranks in terms of Pareto ranking. This may cause the final solution to fall into a local optimum that solution updates remain unchanged in multiple iterations of the genetic algorithm before the optimal solution is obtained and included in the solution set. To resolve this issue, the present invention may select a portion of schedules in the solution set and replace them by new schedules that are randomly generated.

Figure 3:
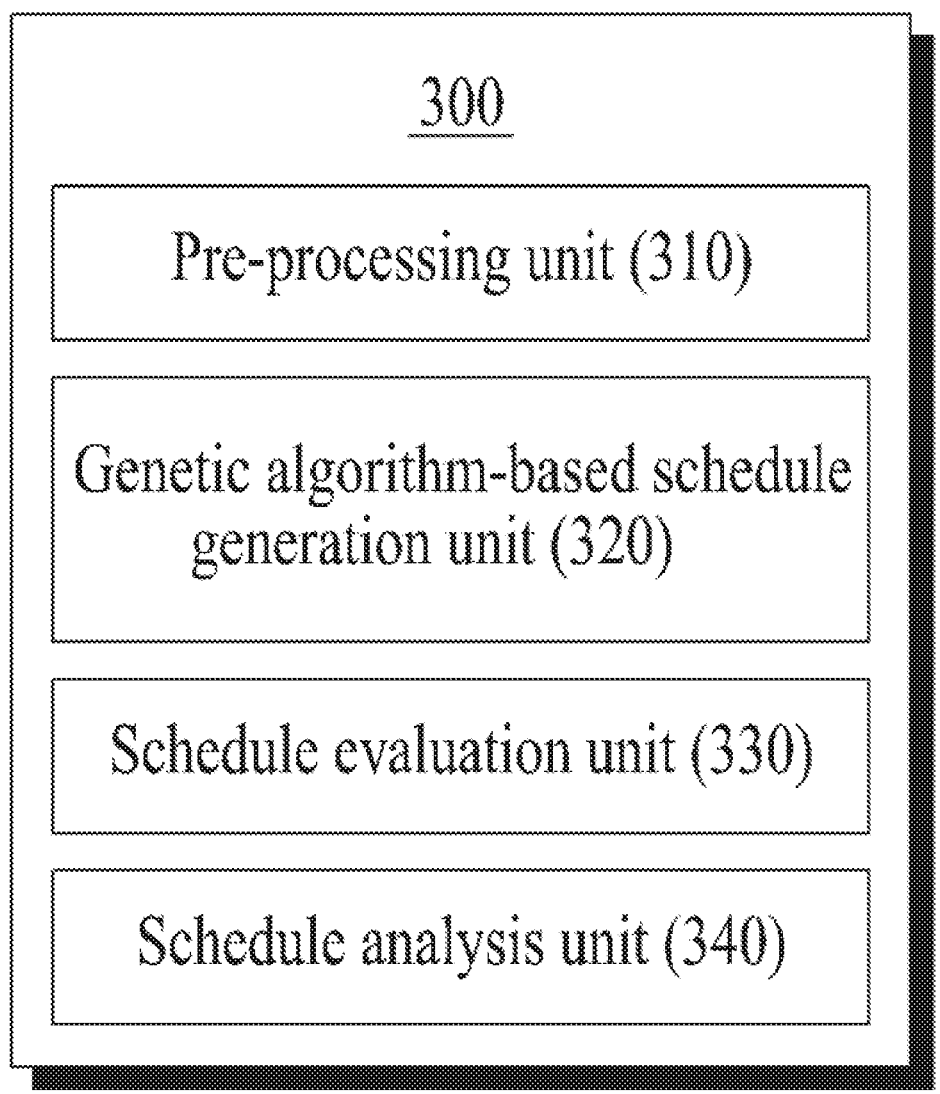
FIG. 3 shows the configuration of an apparatus for automatically scheduling jobs in computer numerical control machines using machine learning according to an embodiment of the present invention.

FIG. 3 shows the configuration of an apparatus for automatically scheduling jobs in computer numerical control machines using machine learning according to an embodiment of the present invention.

The proposed apparatus for automatically scheduling jobs in computer numerical control machines using machine learning includes a pre-processing unit 310, a genetic algorithm-based schedule generation unit 320, a schedule evaluation unit 330, a schedule analysis unit 340 and a display unit (not shown).

The pre-processing unit 310 collects a schedule job list from a database.

The genetic algorithm-based schedule generation unit 320 generates a plurality of schedules with respect to a schedule job to be processed with respect to the schedule job list. It randomly generates N schedules using target job lists to be scheduled, fetched from the database.

The schedule evaluation unit 330 calculates an evaluation index for the plurality of generated schedules. Thereafter, a selection probability is set so that schedules having a better evaluation index have a high selection probability.

When the calculated evaluation index does not reach a target evaluation index based on a result of the schedule analysis unit, the genetic algorithm-based schedule generation unit 320 selects a schedule corresponding to two evaluation indices and generates two new schedules using the genetic algorithm.

The genetic algorithm-based schedule generation unit 320 repeatedly performs the step of selecting a schedule corresponding to two evaluation indices and generating two new schedules using the genetic algorithm until new schedules corresponding to the number of plurality of schedules are generated.

In other words, the genetic algorithm-based schedule generation unit 320 groups the N schedules in pair, updates each schedule pair with new two schedules through crossover operation and mutation operation, and repeats crossover and mutation with respect to new N schedules generated in this way. The genetic algorithm-based schedule generation unit 320 induces various schedules having gradually better evaluation indices to be generated by repeating selection and evaluation processes whenever new N schedules are generated. Thereafter, the schedule evaluation unit 330 generates an evaluation index for the plurality of generated schedules again.

The schedule analysis unit 340 determines whether the calculated evaluation index for the plurality of schedules has reached a target evaluation index. When the calculated evaluation index reaches the target evaluation index, the schedule analysis unit 340 sets a selection probability so that a schedule having the highest evaluation index is selected and returns the selection probability to a user.

Thereafter, the schedule analysis unit 340 incorporates the schedule returned to the user into job assignment information for each machine. The display unit displays the job assignment information for each machine by incorporating the schedule returned to the user into the job assignment information for each machine.

The schedule analysis unit 340 redistributes jobs according to the schedule incorporated into the job assignment information for each machine. The display unit visualizes the redistributed results and displays them on a screen.

Figure 4:
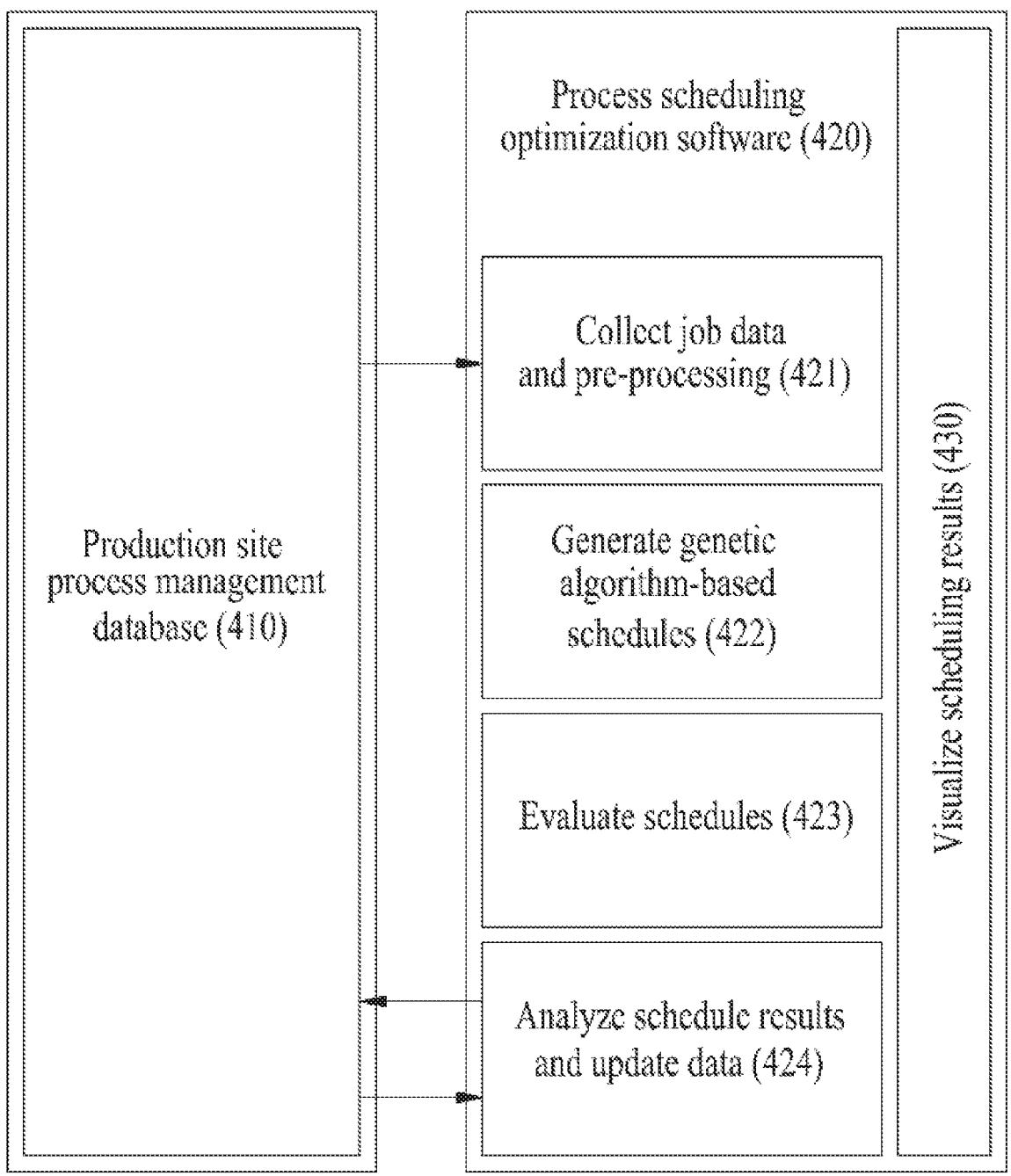
FIG. 4 is a diagram for illustrating an operation of the apparatus for automatically scheduling jobs in computer numerical control machines using machine learning according to an embodiment of the present invention.

FIG. 4 is a diagram for illustrating an operation of the apparatus for automatically scheduling jobs in computer numerical control machines using machine learning according to an embodiment of the present invention.

The proposed apparatus for automatically scheduling jobs in computer numerical control machines using machine learning, as described above, collects a schedule job list from a production site process management database 410 through the pre-processing unit of process scheduling optimization software 420 and performs pre-processing on the schedule job list (421).

Thereafter, the genetic algorithm-based schedule generation unit generates a plurality of genetic algorithm-based schedules with respect to a schedule job to be processed with respect to the schedule job list. When the calculated evaluation index does not reach a target evaluation index based on a result of the schedule analysis unit, the genetic algorithm-based schedule generation unit selects a schedule corresponding to two evaluation indices and generates two new schedules using the genetic algorithm (422).

The genetic algorithm-based schedule generation unit repeatedly performs the step of selecting a schedule corresponding to two evaluation indices and generating two new schedules using the genetic algorithm until new schedules corresponding to the number of plurality of schedules are generated.

The schedule evaluation unit generates an evaluation index for the plurality of generated schedules (423). Furthermore, the schedule analysis unit analyzes whether the calculated evaluation index for the plurality of schedules has reached a target evaluation index (424). Thereafter, the schedule analysis unit sets a selection probability so that schedules having a better evaluation index have a high selection probability.

The plurality of schedules is grouped in pairs, and each schedule pair is updated with new two schedules through crossover operation and mutation operation (424). Crossover and mutation are repeatedly performed on the new schedule generated in this way.

Furthermore, the schedule evaluation unit calculates an evaluation index for the plurality of generated schedules again. When the calculated evaluation index reaches a target evaluation index, the schedule analysis unit, the schedule evaluation unit sets a selection probability so that a schedule having the highest evaluation index is selected and returns the set selection probability to a user.

The schedule returned to the user is incorporated into job assignment information for each machine. The display unit displays the job assignment information for each machine by incorporating the schedule returned to the user into the job assignment information for each machine. The schedule analysis unit redistributes jobs based on the schedule incorporated into the job assignment information for each machine. The display unit visualizes the redistributed results and displays them on a screen (430).

There is a good possibility that schedules incapable of satisfying constraints in the production condition of a factory using only a genetic algorithm of a simple form will be obtained. Accordingly, an embodiment of the present invention generates schedules satisfying a production deadline to a maximum extent, while satisfying realistic constraints to a maximum extent in the environment of a production site, by applying a genetic algorithm of an advanced form in order to satisfy the constraints. This is realized by a method of digitizing the degree that the above constraints are violated again and gradually lowering the probability that such schedules will be selected by applying a penalty to an evaluation index. Accordingly, schedules according to the present invention are more efficient and can contribute to the improvement of stable productivity compared to schedules humanly predicted in a conventional technology through such a method.

In accordance with embodiments of the present invention, an optimized schedules necessary for a production site while satisfying schedule constraints can be proposed and is more efficient than humanly predicted schedules and can contribute to the improvement of stable productivity.

The above-described apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processing apparatus to operate as desired or may instruct the processing apparatus independently or collectively. Software and/or data may be embodied in any type of a machine, component, physical device, virtual equipment, computer storage medium or device in order to be interpreted by the processing apparatus or to provide an instruction or data to the processing apparatus. Software may be distributed to computer systems connected over a network and may be stored or executed in a distributed manner Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as code written by a compiler.

As described above, although the embodiments have been described in connection with the limited embodiments and drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A method of automatically scheduling jobs in computer numerical control machines using machine learning, the method comprising the steps of:
   collecting a schedule job list from a database;
   generating a plurality of schedules for a schedule job to be processed with respect to the schedule job list;
   calculating an evaluation index for the plurality of generated schedules;
   determining whether the calculated evaluation index for the plurality of schedules has reached a target evaluation index; and
   selecting two schedules corresponding to evaluation indices when the calculated evaluation index does not reach the target evaluation index and generating two new schedules using a genetic algorithm,
   wherein the method further comprises the steps of:
   returning to the calculating the evaluation index for the plurality of generated schedules after the selecting the two schedules and the generating the two new schedules are repeatedly performed until new schedules corresponding to the number of the plurality of schedules are generated, setting selection probabilities to the plurality of generated schedules such that a schedule having a higher evaluation index has a higher selection probability, and returning the set selection probabilities to a user, in response that the calculated evaluation index reaches the target evaluation index, in response that one of the plurality of schedules is selected, incorporating the selected schedule into job assignment information for each machine, displaying the job assignment information for each machine, redistributing jobs in accordance with the schedule incorporated into the job assignment information for each machine, and visualizing and displaying the redistributed results on a screen, wherein the calculating the evaluation index for the plurality of generated schedules comprises, for each of the plurality of generated schedules, calculating the evaluation index based on the number of jobs having violated deadlines, a total of delay hours for jobs over due, and an end time of the last job processed, and wherein the selecting two schedules and the generating the two new schedules comprise:

grouping two schedules into a pair among the plurality of schedules, and generating and updating two new schedules through crossover operation and mutation operation for each pair of two schedules, establishing an advanced genetic algorithm, in order to satisfy the target evaluation index, by repeatedly performing the generating and updating until new schedules corresponding to the number of the plurality of schedules are generated, digitizing degree that constraints regarding the evaluation index are violated, and gradually lowering the probability that schedules not reaching the target evaluation are selected by applying a penalty to the evaluation index, and generating optimized schedules by using the advanced genetic algorithm.

\* \* \* \* \*